United States Patent
Tavares Miranda

(10) Patent No.: US 12,397,868 B2
(45) Date of Patent: Aug. 26, 2025

(54) CRANK SET WITH CHAIN GUARD RING AND FASTENING ELEMENT

(71) Applicant: MIRANDA & IRMAO, LDA, Agueda (PT)

(72) Inventor: Joao Filipe Tavares Miranda, Agueda (PT)

(73) Assignee: MIRANDA & IRMAO, LDA, Agueda (PT)

( * ) Notice: Subject to any disclaimer, the term of this patent is extended or adjusted under 35 U.S.C. 154(b) by 377 days.

(21) Appl. No.: 17/289,929

(22) PCT Filed: Oct. 21, 2019

(86) PCT No.: PCT/EP2019/078595
§ 371 (c)(1),
(2) Date: Apr. 29, 2021

(87) PCT Pub. No.: WO2020/088975
PCT Pub. Date: May 7, 2020

(65) Prior Publication Data
US 2022/0001950 A1    Jan. 6, 2022

(30) Foreign Application Priority Data
Oct. 29, 2018   (EP) ..................................... 18203214

(51) Int. Cl.
*B62J 13/00* (2006.01)
*B62M 1/36* (2013.01)
*B62M 3/00* (2006.01)

(52) U.S. Cl.
CPC ................ *B62J 13/00* (2013.01); *B62M 1/36* (2013.01); *B62M 3/00* (2013.01)

(58) Field of Classification Search
CPC .. B62J 13/00; B62M 1/36; B62M 3/00; F16H 7/18; F16H 7/06; F16H 48/22; F16H 48/285
(Continued)

(56) References Cited

U.S. PATENT DOCUMENTS 4,475,894 A * 10/1984 Sugino .................. B62M 9/105
474/144
4,573,950 A * 3/1986 Nagano .................. B62M 9/136
474/144
(Continued)

FOREIGN PATENT DOCUMENTS

| CN | 201437388 U | 4/2010 |
| CN | 202379011 U | 8/2012 |
| DE | 202013103872 U1 | 9/2013 |

OTHER PUBLICATIONS

Office Action dated Dec. 26, 2022, issued by the Taiwanese Patent Office for the corresponding Taiwanese Patent Application No. 108136655, with English translation (11 pages).
(Continued)

*Primary Examiner* — Anna M Momper
*Assistant Examiner* — Juan J Campos, Jr.
(74) *Attorney, Agent, or Firm* — LUCAS & MERCANTI, LLP

(57) ABSTRACT

A crank set for a two-wheeler, the crank set comprising a crank with a crank spider, a chainring and a chain guard ring, the chainring being fastened to the crank spider by fastening elements, and the fastening elements pressing the chainring and the crank spider against one another along a pressing direction. A clamped area of the chain guard ring is clamped in a clamping zone between at least one of the fasteners by which the chainring is secured to the crank spider and the crank spider or chainring and thereby secured to the crank set.

9 Claims, 4 Drawing Sheets

Figure 1:
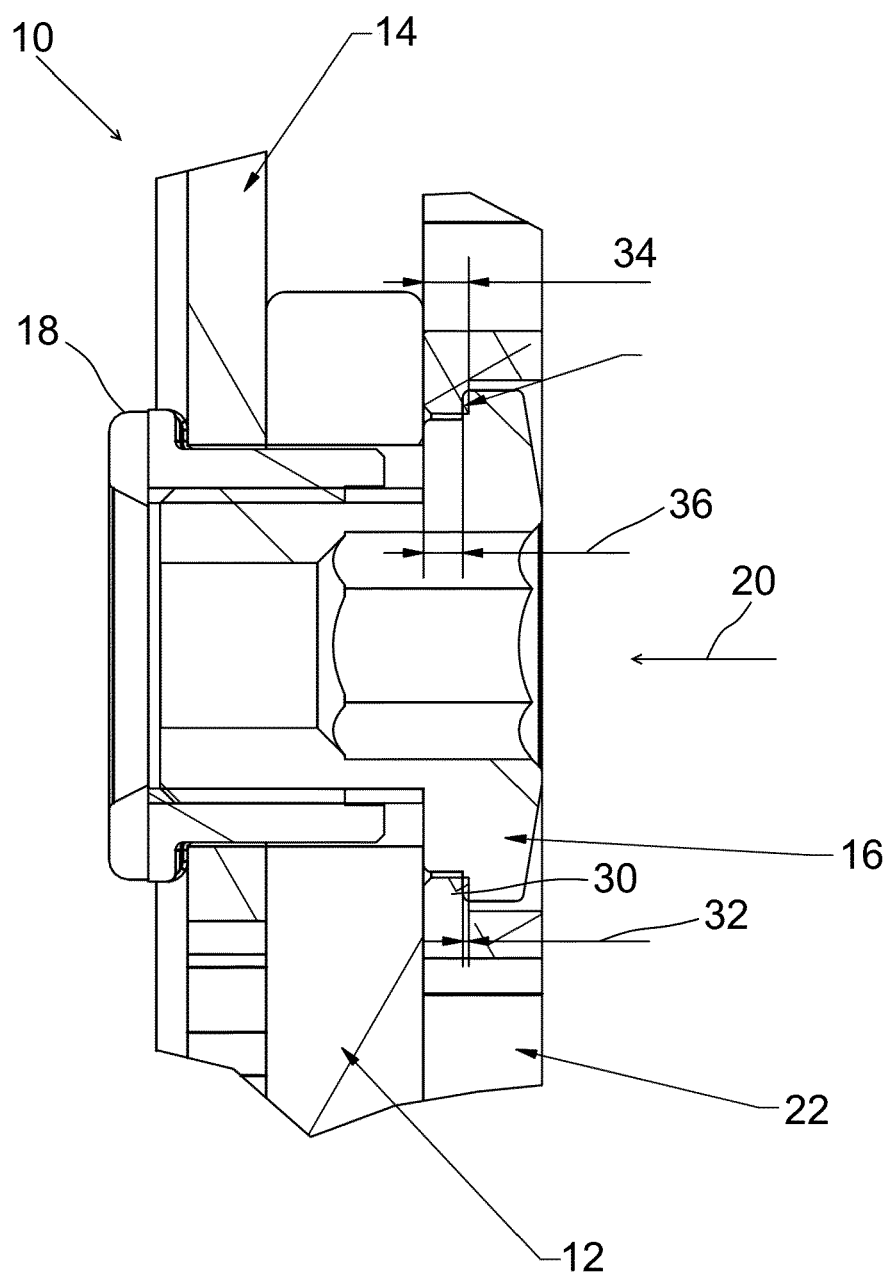

(58) Field of Classification Search
USPC .......................................... 474/144; 184/6.12
See application file for complete search history.

(56) References Cited

U.S. PATENT DOCUMENTS

| | | | | |
|---|---|---|---|---|
| 5,003,840 | A * | 4/1991 | Hinschlager | B62J 23/00 74/609 |
| 5,232,416 | A * | 8/1993 | Amborn | F16H 48/285 475/248 |
| 6,213,238 | B1 * | 4/2001 | Buell | B62M 7/00 180/219 |
| 6,354,973 | B1 * | 3/2002 | Barnett | B62J 13/00 474/140 |
| 6,533,690 | B2 * | 3/2003 | Barnett | B62M 9/138 474/140 |
| 8,162,791 | B1 * | 4/2012 | Cronin | F16H 48/22 475/249 |
| 8,888,629 | B2 * | 11/2014 | Ji | B62M 9/128 474/144 |
| 2002/0160869 | A1 * | 10/2002 | Barnett | B62M 9/138 474/144 |
| 2005/0284252 | A1 * | 12/2005 | Fukui | B62M 3/003 74/594.2 |
| 2006/0058139 | A1 * | 3/2006 | Fry | B62J 13/00 474/144 |
| 2007/0054771 | A1 * | 3/2007 | Fusegi | F16H 48/30 475/231 |
| 2008/0058151 | A1 * | 3/2008 | Curtis | F16H 48/08 475/232 |
| 2008/0161145 | A1 * | 7/2008 | Shiraishi | B62J 13/00 474/145 |
| 2010/0144484 | A1 * | 6/2010 | Bawks | F16H 48/11 475/226 |
| 2013/0161970 | A1 * | 6/2013 | Takasu | B62J 17/00 296/29 |
| 2015/0353155 | A1 * | 12/2015 | Ribeiro Miranda | B62J 13/00 474/144 |
| 2017/0328460 | A1 * | 11/2017 | Schulte | F16D 23/12 |

OTHER PUBLICATIONS

International Search Report and Written Opinion for corresponding International Application No. PCT/EP2019/078595 dated Nov. 5, 2019 (7 Pages).
Extended European Search Report dated Apr. 15, 2019 for Application No. 18203214.4 (7 pages).

* cited by examiner

CRANK SET WITH CHAIN GUARD RING AND FASTENING ELEMENT

CROSS REFERENCE TO RELATED APPLICATION

This Application is a 371 of PCT/EP2019/078595 filed on Oct. 21, 2019, which in turn claims the benefit of European Application No. 18203214.4 filed on Oct. 29, 2018, both applications are incorporated herein by reference.

DESCRIPTION

The invention relates to a crank set as well as a fixing element for a crank set.

Crank sets of the type in question are used for two-wheeled vehicles. Two-wheeled vehicles are understood in particular to be conventional bicycles, but also e-bikes, pedelecs and the like.

Two-wheelers of the type in question regularly have crank sets with which the two-wheeler can be driven. The crank sets of the type in question include at least one chainring attached to a crank spider. In this context, a crank spider in particular means the area of the crank that provides a plurality of attachment points for the chainring. The chainring is often fastened to the crank spider with fastening elements which press the chainring and the crank spider together along a pressing direction. This creates a reliable and rigid connection between chainring and the crank spider.

According to the state of the art, a crank set can also have a chain guard ring. A chain guard ring is a ring-shaped element which is attached to the side of the crank set and extends laterally next to the chainring, especially in the area of the chainring teeth. The chain guard ring in particular serves to prevent the clothing of the rider of the two-wheeler from coming into contact with the teeth of the chainring and/or chain.

According to the state of the art, further fastening elements are usually required for fastening the chain guard ring. On the one hand, this increases the effort involved in assembling the crank set, and on the other, the number of parts required and thus also the weight and costs of the crank set are increased.

The invention therefore aims to providing a crankset for a two-wheeler and a fastening element for such a crankset, which allow simpler assembly and a simpler structure of the crankset, in particular from fewer individual parts.

The problem is solved by a crank set and a fastening element with the following features: having a crank with a crank spider (12), a chainring (14) and a chain guard ring (22), the chainring (14) being fastened to the crank spider (12) by fastening elements,
the fastening elements are pressing the chainring (14) and the crank spider (12) against each other along a pressing direction (20),
characterised in that
a clamped area (30) of the chain guard ring (22) is clamped in a clamping zone between at least one of the fastening elements with which the chainring (14) is fastened to the crank spider (12) and the crank spider (12) or the chainring (14) and is thereby fastened to the crank set (10). The features of the dependent claims relate to preferred embodiments.

The crank set as shown and described has a chain guard ring which is attached to the crank set, in particular to the crank spider, by a clamped area of the chain ring being clamped in a clamping zone between the fastening element and the crank spider or chainring. The fastener is at least one of the fasteners used to attach the chainring to the crank spider.

In this way, it is possible to use the fixing elements required anyway to fix the chainring to the crank spider in order to also fix the chainring to the crank set.

The fastening elements can each have a screw-in element and a screw-on element. The screw-in element and the screw-on element can be screwed together to press the chainring onto the crank spider. Fastening elements designed in this way enable simple and secure fastening of the chainring to the crank spider by inserting the screw-in element and screw-on element from different directions into openings in the chainring and crank spider and then screwing them together.

The screw-on element and/or the screw-in element can have a pressing surface. The pressing surface serves to introduce the pressing force required for pressing the crank spider and chainring together into the chainring and/or crank spider.

The pressing surface can be ring-shaped. A ring-shaped design is particularly advantageous with regard to the uniform distribution of the contact force around the opening through which the screw-on element and/or the screw-in element is introduced into the chainring and/or the crank spider. In addition, a ring-shaped design of the contact surface can often be easily achieved in the production of the fastening element, which is usually, at least essentially, rotationally symmetrical.

The screw-in element and/or the screw-on element can also have a clamping surface which limits the clamping zone on the side facing away from the chainring and/or the crank spider. The clamping surface serves in particular to introduce the clamping force which acts on the chain guard ring when the clamped area of the chain guard ring is clamped in. The clamping surface can be ring-shaped. The clamping zone can also be ring-shaped. Such a design is particularly advantageous if the contact surface is arranged by an annular shoulder of the screw-in element and/or the screw-on element. In this case, the clamping zone may surround the annular shoulder. This provides a comparatively large clamping zone for clamping the area of the chain guard ring with a compact and simply designed fastening element. In addition, the design of the fastening element ensures a largely uniform application of force when the area is clamped.

The clamped area can be deformed by screwing the fastening element in the direction parallel to the pressing direction. In particular, this can be made possible by the fact that the clamped area of the chain guard ring is thicker in the undeformed and unassembled state than the extension of the clamping zone in the pressing direction in the assembled state.

In this context, it is particularly advantageous if the material of the chain guard ring is more easily deformable than the material of the chainring and the material of the crank spider. Then, the screw-in element and the screw-on element can be screwed together as tightly as necessary to create the necessary contact force between the chainring and the crank spider. The clamped area of the chain guard ring is deformed until the end position of the screw-in element and screw-on element is reached. In this way, when the chainring is attached to the crank spider, the chain guard ring is also attached to the crank set. The deformation of the chain guard ring is advantageous in that there is no double fit along the pressing direction which could influence the sufficient pressing of the chainring against the crank spider.

There are also no increased demands on tolerances, especially with regard to the thickness of the components to be screwed together, since any excess dimension of the chain guard ring in the pressing direction is compensated by the deformation of the clamped area and the clamped area of the chain guard ring does not hinder the generation of the pressing force for pressing the chainring and crank spider against each other. The material of the chain guard ring can be a plastic material.

Advantageously, the screw-on element can have a circular cylindrical surface pointing outwards in the area of the screw connection. This extends in the pressing direction in an advantageous way both over at least part of the chainring and over part of the crank spider. In this way, the screw-on element also ensures that the elements involved in the screw connection, in particular the chainring and the crank spider, are correctly aligned when the contact force is applied by screwing them together.

Figure 2:
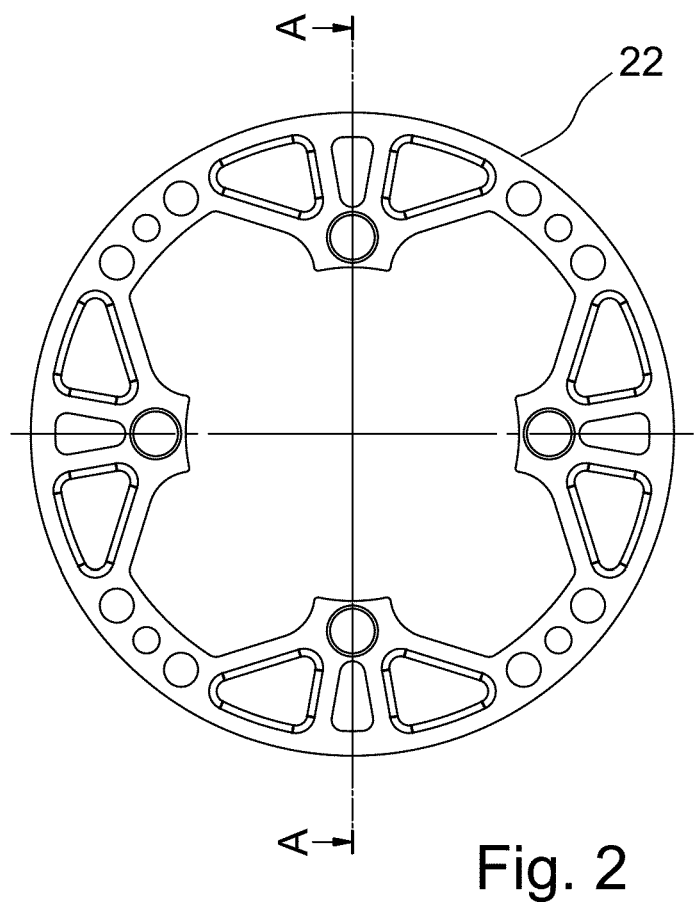
Figure 3:
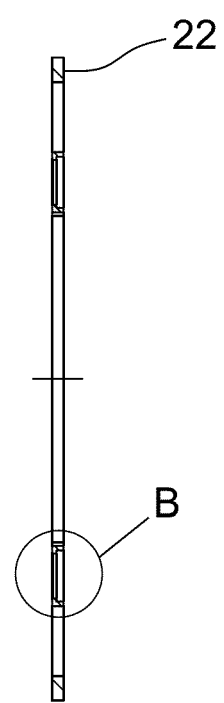
Figure 4:
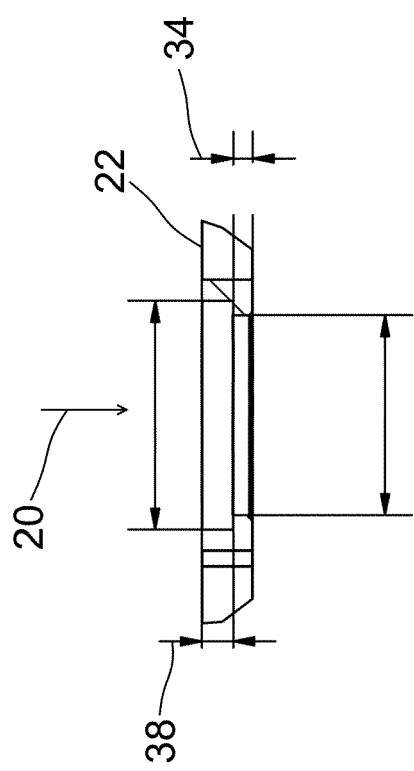
Figure 5:
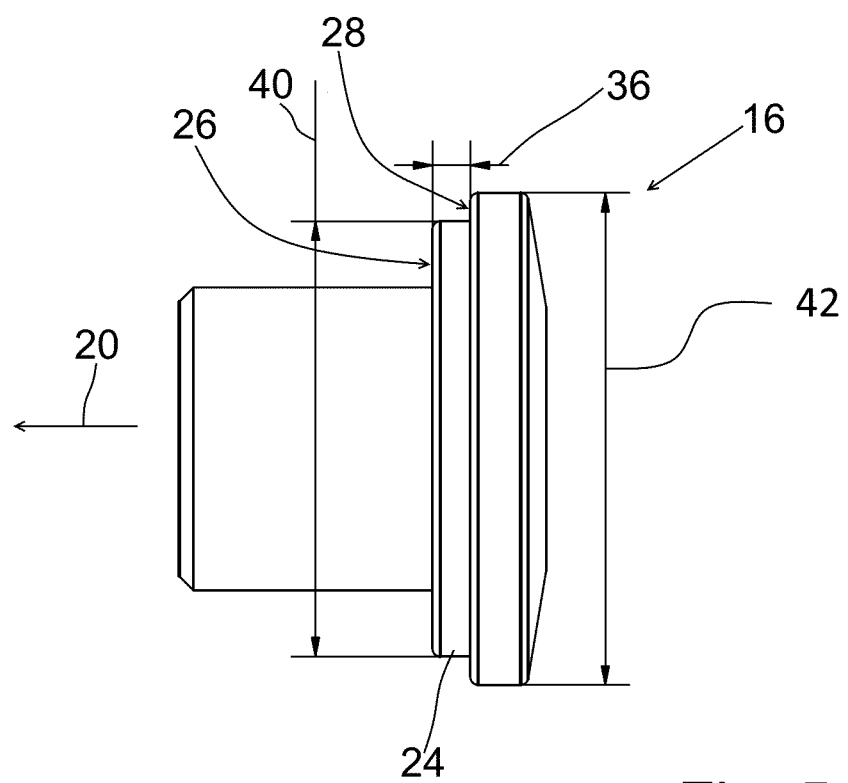

Further practical forms of implementation and advantages of the invention are described below in connection with the drawings. It is shown:

FIG. 1 a sectional view of a part of a crank set in the area of the connection between chainring and crank spider, FIG. 2 a view of the chain guard ring of the crank set from FIG. 1, FIG. 3 a sectional view of the chain guard ring from FIG. 2 along the section line A-A, FIG. 4 an enlargement of area B in FIG. 3, FIG. 5 a view of the screw-in element from FIG. 1

The crank set 10 shown as an example has a crank with a crank spider 12. A chainring 14 is attached to the crank spider 12. The chainring 14 can be fastened with a fastening element comprising a screw-in element 16 and a screw-on element 18. The screw-in element 16 and the screw-on element 18 can be screwed together as shown in the example. As shown as an example, this screw connection can generate a pressing force which presses the chainring 14 and the crank spider 12 together along the pressing direction 20.

The crank set 10 shown as an example also has a chain guard ring 22. The chain guard ring 22 is also attached to the crank set 10 by the fastening element with which the chainring 14 is fastened to the crank spider 12. For this purpose, the fastening element may have a ring-shaped shoulder 24 as shown in the example. As shown in the example, a pressing surface 26 can be provided on this annular shoulder 24, which—as shown in the example—introduces the pressing force along the pressing direction 20 into the crank spider 12. A clamping surface 28, also ring-shaped and pointing in the same direction as the pressing surface 26, surrounds the annular shoulder 24 in the example shown.

Between the clamping surface 28 and the chainring 12, a ring-shaped clamping zone also forms in the example shown, which surrounds the annular shoulder 24. Within this clamping zone, there is a clamped area 30 of the chain guard ring 22. This area 30, which is located within the clamping zone, is also ring-shaped. The area 30 is deformed, i.e. compressed along the pressing direction 20. The compression path 32 by which the area 30 is compressed along the contact pressure direction 20 is at least 0.05 mm, preferably at least 0.15 mm, and/or at most 1 mm, especially at most 0.2 mm.

Correspondingly, the material thickness 34 of the area 30 before attaching the chain guard ring 22 to the crank set 10 can be at least 1 mm, preferably at least 1.15 mm, and/or at most 1.4 mm, preferably at most 1.2 mm.

The extension 36 of the clamping zone along the pressing direction 20 can be at least 0.8 mm, preferably at least 1 mm, and/or at most 1.2 mm, preferably at most 1.15 mm.

As can be seen in FIGS. 2 to 4, the material thickness 34 of the area 30 may be less than the material thickness of the surrounding areas of the chain guard ring 22. The difference 38 of the material thicknesses may be at least 0.05 mm, preferably at least 0.15 mm, and/or at most 1 mm, preferably at most 0.2 mm.

As shown in FIG. 5, the distance between the clamping surface 28 and the pressing surface 26 may correspond to the extension 36.

FIG. 5 shows an example of a screw-in element 16, but in the view shown in FIG. 5 the thread of the screw-in element 16 is not shown. The diameter 40 of the annular shoulder 24 can be at least 10.2 mm, preferably at least 11.5 mm and/or at most 15 mm, preferably at most 12.5 mm.

The outer diameter 42 of the clamping surface 28 can be at least 11.7 mm, preferably at least 13 mm and/or at most 16.5 mm, preferably at most 15 mm.

The features of the invention disclosed in the present description, in the drawings and in the claims may be essential both individually and in any combination for the realisation of the invention in its various forms. The invention is not limited to the described embodiments. It may be varied within the limits of the requirements and taking into account the knowledge of the competent person.

REFERENCE LIST 10 crank set
12 crank spider
14 chain ring
16 screw-in element
18 screw-on element
20 pressing direction
22 chain guard ring
24 annular shoulder
26 pressing surface
28 clamping surface
30 area
32 compression path
34 material thickness
36 extension
38 material thickness difference
40 diameter
42 diameter

The invention claimed is:

1. A crank set for a two-wheeler, the crank set comprising a crank with a crank spider, a chainring and a chain guard ring,
   the chainring being fastened to the crank spider by fastening elements,
   the fastening elements are pressing the chainring and the crank spider against each other along a pressing direction,
   wherein a clamped area of the chain guard ring is clamped in a ring-shaped clamping zone between at least one of the fastening elements with which the chainring is fastened to the crank spider and the crank spider or the chainring and is thereby fastened to the crank set,
   wherein the at least one fastening element contacts the chain guard ring in the clamping zone,
   wherein the clamped area is deformed by the screwing of the at least one fastening element in a direction parallel to the pressing direction,
   wherein the fastening element has an annular shoulder, wherein a pressing surface is provided on the annular shoulder, wherein the fastening element has a ring-shaped clamping surface pointing in a same direction as the pressing surface, wherein the ring-shaped clamping surface delimits the ring-shaped clamping zone on a side remote from the chainring and/or the crank spider, wherein the clamping surface surrounds the annular shoulder, wherein the material of the clamping zone of the chain guard ring where the at least one fastening element contacts the chain guard ring is a plastic material that is more easily deformable than a second material of the chainring and a third material of the crank spider.

2. The crank set according to claim 1, wherein the at least one fastening element has a screw-in element and a screw-on element, wherein the screw-in element and the screw-on element are screwed together for pressing the chainring onto the crank spider.

3. The crank set according to claim 2, wherein the fastening screw-in element and/or the screw-on element has the pressing surface.

4. The crank set according to claim 3, wherein the pressing surface is of ring-shaped design.

5. The crank set according to claim 3, wherein the pressing surface is arranged on an annular shoulder of the screw-in element and/or of the screw-on element.

6. The crank set according to claim 5, wherein the clamping zone surrounds the annular shoulder.

7. The crank set according to claim 2, wherein the screw-on element has an outwardly pointing circular cylindrical surface in the region of the screw connection.

8. The crank set according to claim 2, wherein the screw-in element and/or the screw-on element has the clamping surface which delimits the clamping zone on the side remote from the chainring and/or the crank spider.

9. The crank set according to claim 1, wherein the clamped-in region clamped area is deformed by the screwing of the at least one fastening element in the direction parallel to the pressing direction.

* * * * *